United States Patent [19]

Uyama et al.

[11] Patent Number: 4,807,521
[45] Date of Patent: Feb. 28, 1989

[54] ACTUATOR CASING

[75] Inventors: Shintaro Uyama; Ryuji Ohta, both of Saitama, Japan

[73] Assignee: Jidosha Kiki Co., Ltd., Japan

[21] Appl. No.: 125,489

[22] Filed: Nov. 25, 1987

[30] Foreign Application Priority Data

Nov. 29, 1986 [JP] Japan .................................. 61-284958

[51] Int. Cl.⁴ ............................................ F01B 11/02
[52] U.S. Cl. ...................................................... 92/169
[58] Field of Search ................ 92/169.1, 169.2, 169.3, 92/169.4; 60/547.1; 220/66

[56] References Cited

U.S. PATENT DOCUMENTS

| 4,433,614 | 2/1984 | Takeuchi et al. ............... 92/169.3 X |
| 4,492,081 | 1/1985 | Weiler et al. ................... 92/169.2 X |
| 4,567,728 | 2/1986 | Ohmi et al. ..................... 92/169.1 X |
| 4,611,526 | 9/1986 | Arino et al. . |

FOREIGN PATENT DOCUMENTS

| 57-30654 | 2/1982 | Japan . |
| 57-107946 | 7/1982 | Japan . |
| 209455 | 12/1982 | Japan ................................. 92/169.1 |
| 60-561 | 1/1985 | Japan . |
| 2070171 | 9/1981 | United Kingdom ............... 60/547.1 |
| 2087498 | 5/1982 | United Kingdom ............... 92/169.1 |
| 2091828 | 8/1982 | United Kingdom ............... 92/169.1 |

OTHER PUBLICATIONS

Drawings in reference to U.S. Pat. No. 4,688,611, dated Jan. 22, 1985, applicant Kohei Mori et al.

Primary Examiner—Robert E. Garrett
Assistant Examiner—M. Williamson
Attorney, Agent, or Firm—Flynn, Thiel, Boutell & Tanis

[57] ABSTRACT

A casing for use in a brake booster or clutch booster is provided. The casing includes a cylindrical portion which defines an outer periphery thereof, a flat central end wall which is disposed substantially perpendicular to the axis of the cylindrical portion, and a frustoconical portion which interconnects the cylindrical portion and the central end wall. According to the invention, a flat peripheral end wall is disposed between the cylindrical portion and the frustoconical portion so as to be substantially perpendicular to the axis of the cylindrical portion, thus increasing the rigidity of the casing.

6 Claims, 3 Drawing Sheets

ACTUATOR CASING

FIELD OF THE INVENTION

The invention relates to an actuator casing, and more particularly, to a casing which is preferred for use in an actuator associated with a brake booster or clutch booster.

DESCRIPTION OF THE PRIOR ART

There has been a strong need for a reduction in the size and the weight of a brake booster or a clutch booster, which is partly achieved by reducing the wall thickness of a casing used therefor. A casing which is used for an actuator of the kind described comprises a cylindrical portion which defines the outer periphery of the casing, a central end wall which is substantially perpendicular to the axis of the cylindrical portion, and a frustoconical portion which interconnects the cylindrical portion and the central end wall, all of which are integrally formed so as to be continuous throughout. If the wall thickness of the casing is simply reduced, there results a reduction in the rigidity. Accordingly, various proposals have been made in the prior art to prevent a reduced rigidity while allowing a reduction in the wall thickness of the casing.

By way of example, Japanese Laid-Open Patent Application No. 107,946/1982 discloses an arrangement for a casing which is internally provided with a reinforcing plate which is in turn formed with ribs or folds. Japanese Laid-Open Patent Application No. 30,654/1982 discloses a different casing which is internally provided with a reinforcing plate. Finally, Japanese Patent Publication No. 561/1985 discloses an arrangement which is based on a casing as described above and in which the frustoconical portion is replaced by a specially configured construction which is subject to a uniform stress.

Where a reinforcing plate is internally provided within a casing, the provision of the plate stands in the way to reducing the weight of the casing, and also is disadvantageous in respect of the cost. In addition, where a reinforcing plate is used, an accommodation must be made to prevent an abutment of a power piston, which is operable within the casing, against the reinforcing plate. This requires an increase in the axial size of the actuator as a result of the provision of the reinforcing plate, again standing in the way to achieving a reduced weight of the casing.

On the other hand, a specially configured casing having a frustoconical portion which is subject to a uniform stress is advantageous in achieving a reduction in the weight as compared with the provision of the reinforcing plate, but the special configuration must be achieved with an increased cost as compared with the latter.

SUMMARY OF THE INVENTION

Therefore, it is an object of the invention to allow a reduction in the size and the weight of a casing in an inexpensive manner without causing a reduction in the rigidity of the casing.

At this end, according to the invention, a flat peripheral end wall extending substantially perpendicular to the axis of the cylindrical portion is formed between the cylindrical portion and the frustoconical portion, with the cylindrical portion, the peripheral end wall, the frustoconical portion and the central end wall being formed together in an integral manner.

With a casing thus constructed, when a force acts axially upon the central end wall in a direction from the inside to the outside thereof, the cylindrical portion tends to reduce the diameter radially inward under the influence of the force applied.

In a casing of the prior art which is devoid of the peripheral end wall between the cylindrical portion and the frustoconical portion, sufficient rigidity can be secured which is effective to enable the frustoconical portion to oppose the radially inward shrinkage of the cylindrical portion if the frustoconical portion has an increased angle of inclination in the radial direction. However, if the angle of inclination is reduced in order to reduce the axial size of the actuator, this allows the cylindrical portion to be readily reduced in diameter radially inward, thus degrading the rigidity of the casing.

By contrast, when the peripheral end wall is provided between the cylindrical portion and the frustoconical portion in accordance with the invention, the peripheral end wall will be located coplanar with the direction in which the cylindrical portion is reduced in diameter while allowing an increased angle of inclination for the frustoconical portion, thereby allowing the combination of the peripheral end wall and the frustoconical portion to oppose a reduction in the diameter of the cylindrical portion, thus improving the rigidity of the casing.

If a force acts upon the central end wall in the opposite direction, namely, from the outside to the inside, substantially the same effect is achieved as mentioned above even though the direction in which the force acts is opposite. The same applies when a radially directed force is directly applied to the cylindrical portion. In this manner, the rigidity of the casing can be improved in either instance.

Since it is only necessary according to the invention that a peripheral end wall be provided between the cylindrical portion and the frustoconical portion, a further reduction in the weight can be achieved as compared with the provision of the reinforcing plate while allowing the casing to be manufactured more inexpensively as compared with the use of a special configuration for the frustoconical portion.

Other objects, features and advantages of the invention will become apparent from the following description of an embodiment thereof with reference to the attached drawings.

DETAILED DESCRIPTION OF EMBODIMENT

Figure 1:
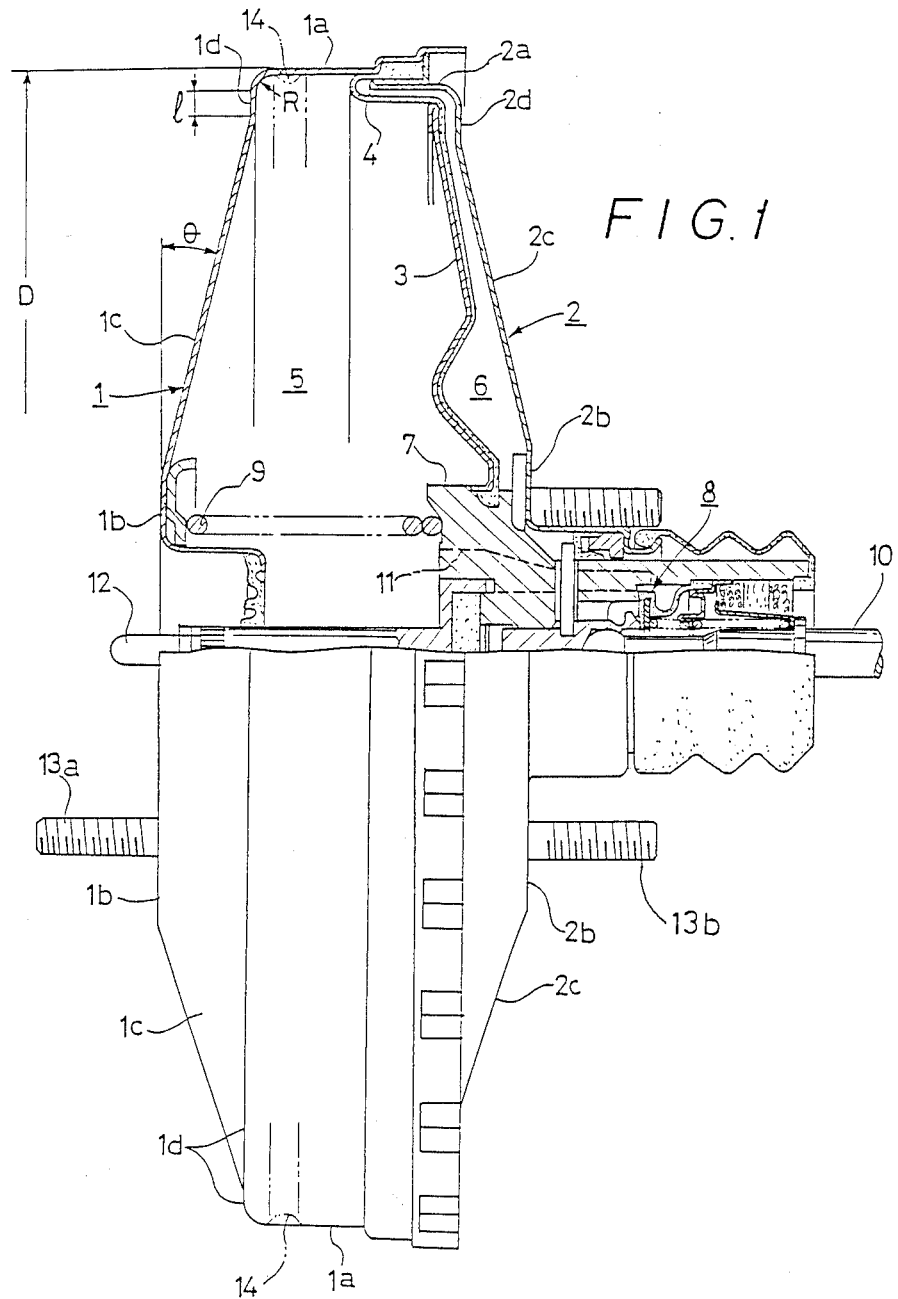
FIG. 1 is a cross section of one embodiment of the invention taken along the line I—I shown in FIG. 2.
Figure 2:
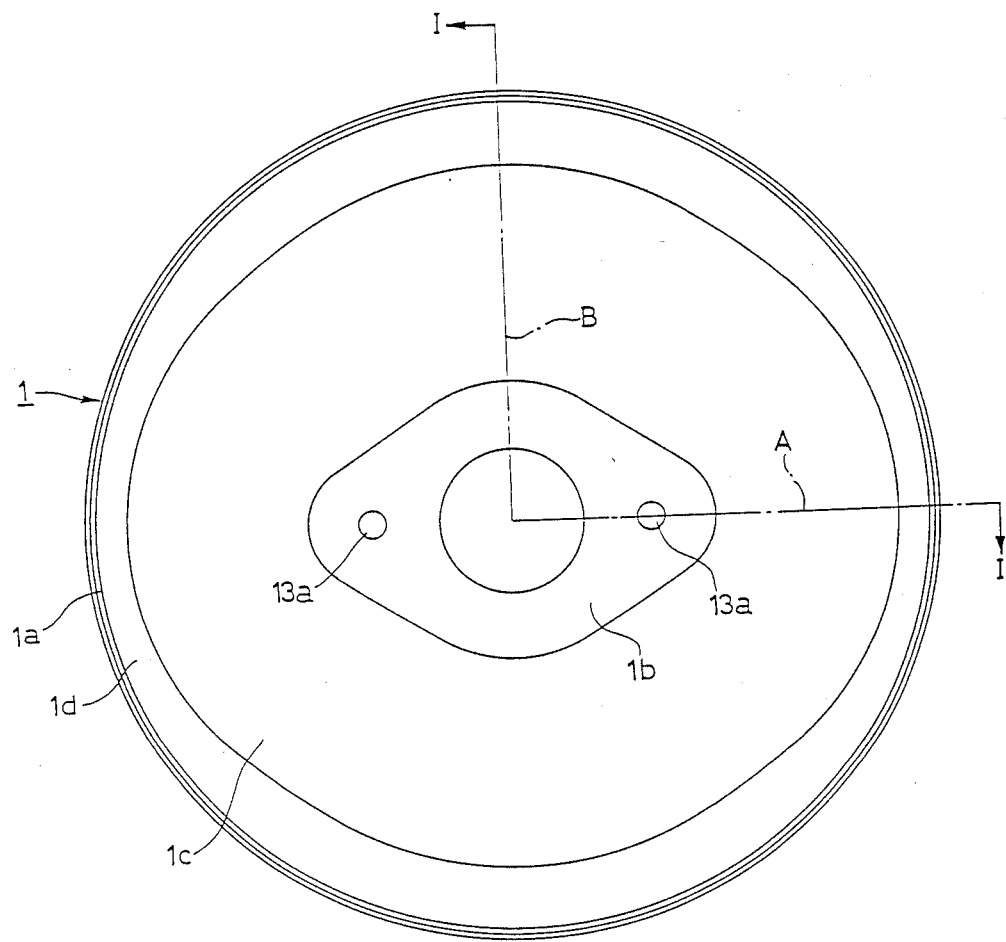
FIG. 2 is a left-hand side elevation of the arrangement shown in FIG. 1.

An embodiment of the invention as applied to the casing of a brake booster will now be described. Referring to FIG. 1, a brake booster comprises a front casing 1 and a rear casing 2, and a power piston is slidably disposed in a space defined by the casings 1 and 2. A diaphragm 4 is applied to the back surface of the power piston 3 and the combination of the power piston 3 and the diaphragm 4 divides the interior of the casing 1 into a forwardly located, constant pressure chamber 5 and a rearwardly located, variable pressure chamber 6.

An axial portion of the power piston 3 is integrally formed with a valve body 7 which houses a valve mechanism 8 for switching a fluid path. The power piston 3 and the valve body 7 are normally maintained in their inoperative positions, shown, by a return spring 9.

An input shaft 10 is mechanically associated with a brake pedal, not shown, and in its inoperative mode when no depressing action is applied to the input shaft 10, the valve mechanism 8 establishes a communication between the chambers 5 and 6, whereby a negative pressure which is normally introduced into the chamber 5 is introduced into the variable pressure chamber 6 through a passage 11 formed in the valve body 7 and through the valve mechanism 8. No fluid pressure differential is developed across the power piston 3 under this condition, whereby the brake booster maintains its inoperative condition shown.

By contrast, when a depressing action is applied to the input shaft 10, the valve mechanism 8 operates to interrupt a communication between the chambers 5, 6, and the atmosphere of a pressure which depends upon the depressing action is introduced into the variable pressure chamber 6. This develops a fluid pressure differential across the power piston 3, whereby the power piston 3, the valve body 7 and its associated push rod 12 are driven to the left, as viewed in FIG. 1, thereby actuating a master cylinder, not shown, which is associated with the push rod 12 to produce a braking liquid pressure.

More specifically, the front casing 1 and the rear casing 2 each comprise cylindrical portions 1a, 2a which define the outer periphery of the casing, flat central end walls 1b, 2b which are disposed substantially perpendicular to the axes of the cylindrical portions 1a, 2a, and frustoconical portions 1c, 2c which extend from the central end walls 1b, respectively. In accordance with the invention, flat peripheral end walls 1d, 2d are formed between the cylindrical portions 1a, 2a and the frustoconical portions 1c, 2c, respectively, so as to be substantially perpendicular to the axes of the cylindrical portions 1a, 2a. The cylindrical portions 1a, 2a, the peripheral end walls 1d, 2d, the frustoconical portions 1c, 2c and the central end walls 1b, 2b are integrally formed so as to be continuous throughout.

In a conventional casing, peripheral end walls 1d, 2d are not formed between cylindrical portions 1a, 2a and frustoconical portions 1c, 2c, but the latter portions which have been connected together directly. When it is desired to reduce the axial size of a brake booster constructed with a casing of the kind described while maintaining the stroke of a power piston constant, an angle of inclination $\theta$ of frustoconical portions 1c, 2c with respect to the radial direction will have to be reduced. However, when such angle is reduced below 12°, there results a drastic reduction in the rigidity of the casing.

Figure 3:
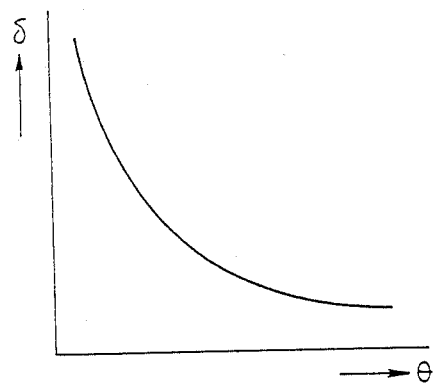
FIG. 3 graphically depicts an approximate relationship between a radially inward deflection $\delta$ of cylindrical portions 1a, 2a and an angle of inclination $\theta$ of frustoconical portions 1c, 2c.

FIG. 3 graphically depicts an approximate relationship between a radially inward deflection $\delta$ of the cylindrical portions 1a, 2a and the angle of inclination $\theta$ which obtains when the central end walls 1b, 2b are axially urged in a direction from their inside to their outside while utilizing a conventional casing structure as mentioned above. It will be noted that when the angle of inclination $\theta$ is reduced, there occurs a rapid increase in the deflection $\delta$.

By contrast, when the peripheral end walls 1d, 2d are disposed between the cylindrical portions 1a, 2a and the frustoconical portions 1c, 2c as in the embodiment described above, the peripheral end walls 1d, 2d are disposed to be coplanar with the direction in which the diameter of the cylindrical portions 1a, 2a is reduced while allowing the angle of inclination $\theta$ of the frustoconical portions 1c, 2c to be increased as compared with an arrangement in which the peripheral end walls 1d, 2d are absent. Accordingly, the peripheral end walls 1d, 2d and the frustoconical portions 1c, 2c both oppose a reduction in the diameter of the cylindrical portions 1a, 2a in a favorable manner.

Figure 4:
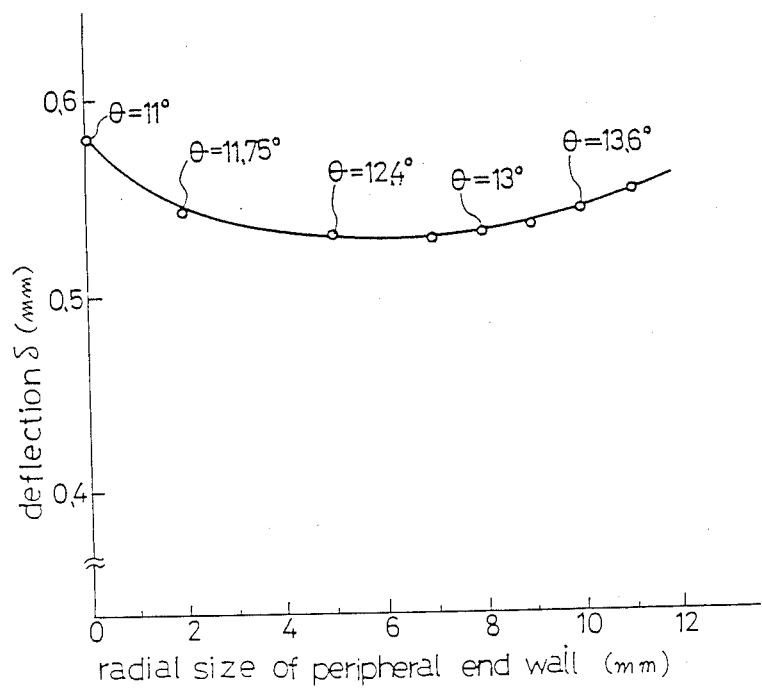
FIG. 4 graphically shows a result of analysis of the radially inward deflection $\delta$ of the cylindrical portion 1a for different values of the radial size l of the peripheral end wall 1b, using the finite element technique.

FIG. 4 is a graphical representation of a result of analysis by the finite element technique of the radially inward deflection $\delta$ of the cylindrical portion 1a which occurs when the radial size l of the peripheral end wall 1d is changed. The result shown is obtained using a diameter D of 235 mm for the cylindrical portion 1a, a radius R of 2 mm for the connection between the cylindrical portion 1a and the peripheral end wall 1d, choosing an angle of inclination $\theta$ of 11° when the radial size l of the peripheral end wall 1d is equal to zero and a load P of 365 kg which is applied axially to the central end wall 1b in a direction from its inside to its outside. It will be understood from the result of analysis shown that the deflection $\delta$ will be at its minimum when the radial size l of the peripheral end wall 1d is chosen to be equal to about 7 mm, with a corresponding angle of inclination $\theta$ of 12.8°.

In the present embodiment, the central end wall 1b of the front casing 1 is substantially diamond-shaped so that its size measured along the direction of a line A, joining a pair of master cylinder mounting bolts 13a, is greater than the size measured along the direction of a line B which is perpendicular thereto, considering the mounting position of such bolts. Accordingly, the angle of inclination $\theta$ of the frustoconical portion 1c will have a value in the direction of the line A which is different from that obtained in the direction of the line B. For this reason, in the present embodiment, the finite element technique is employed to determine optimum radial sizes l of the peripheral end wall in the directions of the lines A and B as well as directions intermediate therebetween. The size l varies smoothly in a circumferential direction. In this instance, the size l in the direction of the line A is less than the size l in the direction of the line B.

The central end wall 2b of the rear casing 2 is square-shaped considering the mounting position of mounting bolts 13b which are used to mount the actuator upon a car body (not shown). In this instance, the radial size of the peripheral end wall 2d is uniform circumferentially. However, it should be understood that the radial size of the peripheral end wall 2d may vary in the circumferential direction taking into consideration the configuration of the central end wall 2b in the same manner as described above in connection with the front casing 1. Conversely, the central end wall 2b may be formed as a circle of a uniform diameter. It should also be understood that the front casing 1 having substantially diamond-shaped central end wall 1b may have a uniform radial size of the peripheral end wall 1d in a circumferential direction in order to simplify its manufacturing.

As shown by phantom lines in FIG. 1, adjacent to the peripheral end wall 1d, the cylindrical portion 1a may be formed with annular grooves 14 which project radially inward while avoiding an abutment against the power piston 3, thereby further enhancing the rigidity.

While the invention has been shown and described above in connection with the preferred embodiment thereof, it should be understood that a number of changes, modifications and substitutions will readily occur to one skilled in the art without departing from the spirit and scope of the invention defined by the appended claims.

What is claimed is:

1. An actuator comprising a front casing and a rear casing, at least one of said casings comprising:
   a cylindrical portion of circumferentially continuous substantially circular shape and which defines the outer periphery of the casing;
   a flat central end wall disposed substantially perpendicular to the axis of the cylindrical portion;
   a frustoconical portion interposed between the cylindrical portion and the central end wall and connected to said central end wall; and
   means for enhancing the axial stiffness of at least said one casing and defining a flat peripheral end wall connecting the cylindrical portion and the frustoconical portion and oriented substantially perpendicular to the axis of the cylindrical portion, the cylindrical portion and peripheral end wall and frustoconical portion and central end wall being integrally formed so as to be continuous throughout;
   master cylinder coupling bolts mounted on and extending forward from said front casing for mounting a master cylinder in front of said actuator;
   vehicle mounting bolts mounted on and extending rearward from said rear casing for mounting said actuator on a vehicle, said master cylinder coupling bolts and vehicle mounting bolts being axially spaced apart and separate from each other, the constancy of the axial distance between said master cylinder coupling bolts and vehicle mounting bolts during operation of said actuator being determined by the axial stiffness of said front and rear casings, said axial stiffness being enhanced by interposition of said flat peripheral end wall between said frustoconical portion and cylindrical portion.

2. An actuator casing according to claim 1 in which the peripheral end wall has a radial size which varies in the circumferential direction, the central end wall being substantially diamond-shaped, the entire peripheral end wall being radially spaced outward from the diamond shaped central end wall by a distance substantially greater than the radial extent of the peripheral end wall itself, said peripheral end wall being circular at its outer edge and oval at its inner edge, said peripheral end wall having its maximum radial extent along the minor axis of said diamond.

3. An actuator casing according to claim 2 in which the cylindrical portion is formed with an annular groove which projects radially inward.

4. An actuator casing according to claim 1 in which the actuator comprises a brake booster.

5. An actuator casing according to claim 1 in which the actuator comprises a clutch booster.

6. An actuator comprising a front casing and a rear casing, at least one of said casings comprising:
   a cylindrical portion of circumferentially continuous substantially circular shape and which defines the outer periphery of the casing;
   a flat central end wall disposed substantially perpendicular to the axis of the cylindrical portion;
   a frustoconical portion interposed between the cylindrical portion and the central end wall and connected to said central end wall; and
   means for enhancing the axial stiffness of at least said one casing and defining a flat peripheral end wall connecting the cylindrical portion and the frustoconical portion and oriented substantially perpendicular to the axis of the cylindrical portion, the cylindrical portion and peripheral end wall and frustoconical portion and central end wall being integrally formed so as to be continuous throughout;
   the central end wall being substantially diamond-shaped, the entire peripheral end wall being radially spaced outward from the diamond shaped central end wall by a distance substantially greater than the radial extent of the peripheral end wall itself, said peripheral end wall being circular at its outer edge and oval at its inner edge, said peripheral end wall having its maximum radial extent along the minor axis of said diamond.

* * * * *